(12) United States Patent
Ting et al.

(10) Patent No.: US 8,849,596 B2
(45) Date of Patent: Sep. 30, 2014

(54) IDENTIFICATION DETECTION SYSTEM FOR POWER CONSUMPTION OF ELECTRIC APPLIANCE

(75) Inventors: Roy Ting, New Taipei (TW); Max Li, New Taipei (TW)

(73) Assignees: Max Li, New Taipei (TW); Roy Ting, New Taipei (TW)

( * ) Notice: Subject to any disclaimer, the term of this patent is extended or adjusted under 35 U.S.C. 154(b) by 369 days.

(21) Appl. No.: 13/209,400

(22) Filed: Aug. 13, 2011

(65) Prior Publication Data

US 2013/0041605 A1    Feb. 14, 2013

(51) Int. Cl.
| | |
|---|---|
| G06F 19/00 | (2011.01) |
| G01R 21/00 | (2006.01) |
| G01D 4/00 | (2006.01) |
| H01R 24/28 | (2011.01) |
| H01R 103/00 | (2006.01) |

(52) U.S. Cl.
CPC ............. *G01D 4/002* (2013.01); *Y02B 70/3266* (2013.01); *H01R 24/28* (2013.01); *Y04S 20/32* (2013.01); *Y04S 20/242* (2013.01); *H01R 2103/00* (2013.01); *Y04S 20/38* (2013.01); *Y02B 90/241* (2013.01)
USPC ................ 702/62; 307/140; 700/295; 702/61

(58) Field of Classification Search
CPC .... G01D 4/002; H01R 2103/00; H01R 24/28; Y04S 20/38; Y04S 20/242; Y04S 20/32; Y04S 20/14; Y02B 90/241; Y02B 70/3266; Y02B 90/224; H01H 9/54; H01H 2300/03; G06Q 10/06

USPC .............. 702/60, 61, 62, 68, 73, 74, 75, 122; 307/140; 323/273; 700/286, 295
See application file for complete search history.

(56) References Cited

U.S. PATENT DOCUMENTS

| | | | |
|---|---|---|---|
| 8,461,725 B1 * | 6/2013 | Stubbs et al. | 307/140 |
| 2011/0313693 A1 * | 12/2011 | Inoue et al. | 702/61 |

* cited by examiner

*Primary Examiner* — John H Le

(57) ABSTRACT

An identification system for power consumption of electric appliance has multiple electric appliances, each electric appliance having a dedicated identification transmission circuit connected to a power-connecting loop; multiple power sockets mounted within a power supply region, each power socket having at least one identification receiver for receiving identification transmission signals from the corresponding electric appliance and obtaining a corresponding identification code; multiple energy management units respectively mounted in the power sockets to connect with the corresponding identification receivers, recognize the respective electric appliances by determining the identification codes, and record power consumption information of the corresponding electric appliances; and an energy management server connected to the energy management units and the identification receivers to communicate therewith in a wired or wireless manner. Individual and overall power consumption of all the electric appliances within the power supply region can be collected, recorded and calculated as the reference for future power management.

15 Claims, 5 Drawing Sheets

IDENTIFICATION DETECTION SYSTEM FOR POWER CONSUMPTION OF ELECTRIC APPLIANCE

FIELD OF THE INVENTION

The present invention relates to an identification detection system for power consumption of electric appliance, and more particularly to a system capable of effectively calculating and recording power consumption information collected from individual and entire electric appliances in a power supply region for the purpose of power management coordination.

BACKGROUND OF THE INVENTION

Technological advancement gives rise to a multitude of electric appliances, such as electric fans, rice cookers, stereo systems, computers and the like. Although these electric appliances can bring a lot of convenience to the quality of human life, the resulting power consumption thereof continuously escalates. Despite the power-saving feature addressed by the improved new generation of electric appliances, many conventional electric appliances having high power consumption are ubiquitous in everyone's daily life.

Hence, a power control device disclosed by a Taiwanese Utility Model Patent Number M376989 serves to perform signal setup, editing, timing and control setup by using a circuit board of a control module to connect an control element to external default electronic device through a connection interface so as to transmit signals to a signal transmitter disposed in an power socket through a signal transfer unit. The signals received by the signal transmitter are further sent to relays to control the relays and switch on or off one or multiple power sockets. By using the control module to switch on or off the power sockets, the purpose of switching on and off or controlling preset electric appliances electrically connected with the power sockets can be achieved.

An electrical power distribution system disclosed by a patent publication number of the world intellectual property organization WO2005CA01549 serves to connect to power sources of electric appliances so as to perform a distribution scheme in limiting and breaking current to electric appliances. The system has a PCD tag disposed on an electric appliance or attached with the power cord of the electric device for connection with a power socket having a corresponding PCD reader for power acquisition. The PCG tag is stored with data associated with electric appliances therein and the data can be read and stored by the PCD reader and primarily include data for a rated load of the electric appliance. Furthermore, the system further has a switch for connecting and disconnecting with a power socket. Accordingly, the system can measure a load class of an electric appliance and provide a breaking signal from the control circuit based on an excess between the actual load of the electric appliance and a corresponding rated load to break the power supply off the electric appliance.

Although the foregoing two conventional devices can achieve the purpose of switch control and power management to electric appliances, the reconfiguration of an electronic device when the electronic device is plugged in another power socket or used in another environment causes inconvenience in management. Additionally, in practice only certain electric appliances can be controlled and limited in terms of power supply while actual power consumption of all electric appliances in a power supply region fails to be effectively tracked. The collected power consumption information is incomplete and thus infeasible as the reference to a new generation of intelligent power grid for remotely monitoring and managing power consumption at any time. As a result, the drawback fails to effectively improve management in power transmission and power supply.

SUMMARY OF THE INVENTION

The objective of the present invention is to provide an identification detection system for power consumption of electric appliance capable of effectively tracking, collecting and recording actual power consumption information of all electric appliances within a power supply region.

To achieve the foregoing objective, the identification detection system for power consumption of electric appliance has multiple electric appliances, multiple power sockets, multiple energy management units, multiple remote clients (such as mobile phone or computer) and an energy management server.

Each electric appliance has a dedicated identification transmission circuit and a power plug. The dedicated identification transmission circuit is connected to a power-connecting loop.

The power sockets are mounted within a power supply region. Each power socket has at least one identification receiver for receiving identification transmission signals transmitted from a corresponding plugged electric appliance and obtaining a corresponding identification code.

The energy management units are respectively mounted in the power sockets to connect with the corresponding identification receivers, recognize the respective electric appliances by determining the identification codes, and record power consumption information of the corresponding electric appliances.

The energy management server is networked with the energy management units and the identification receivers respectively mounted on the power sockets so as to communicate with the energy management units and the identification receivers in a wired line or wireless manner.

Given the identification detection system for power consumption of electric appliance, individual and overall power consumption of all the electric appliances within a same power supply region can be collected, recorded and calculated as the reference for future power management.

The foregoing and other features and advantages of the present invention will be more clearly understood through the following descriptions with reference to the drawing, wherein

DETAILED DESCRIPTION OF THE PREFERRED EMBODIMENT

The present invention will now be described more specifically with reference to the following embodiments. It is to be noted that the following descriptions of preferred embodiments of this invention are presented herein for the purpose of illustration and description only; it is not intended to be exhaustive or to be limited to the precise form disclosed.

To further understand the structure and applications of the present invention, with reference to FIGS. 1 to 6, an identification detection system for power consumption of electric appliance has multiple electric appliances 1, multiple power sockets 2, multiple energy management units 3 and an energy management server 4.

Figure 1:
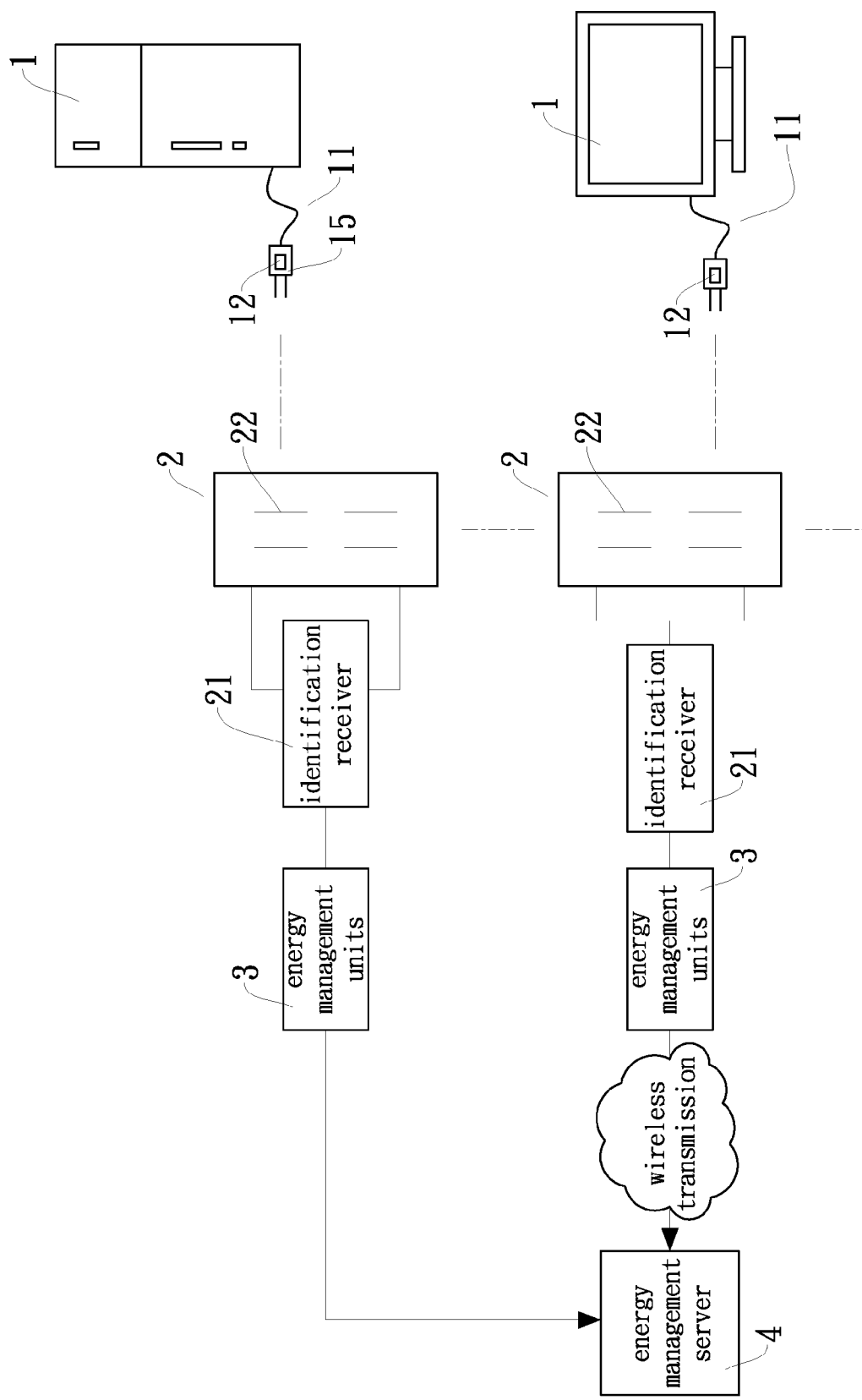
FIG. 1 is a functional block diagram of an identification detection system for power consumption of electric appliance in accordance with the present invention.
Figure 2:
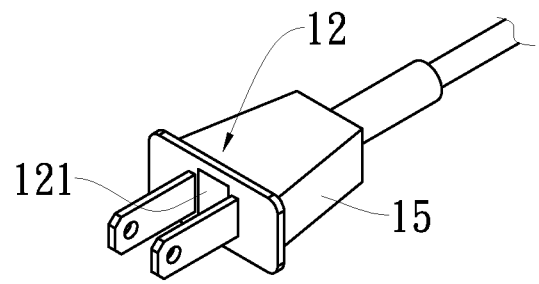
FIG. 2 is a perspective view of a plug of an electric appliance of the identification detection system in FIG. 1 having an identification transmission circuit directly disposed thereon.
Figure 3:
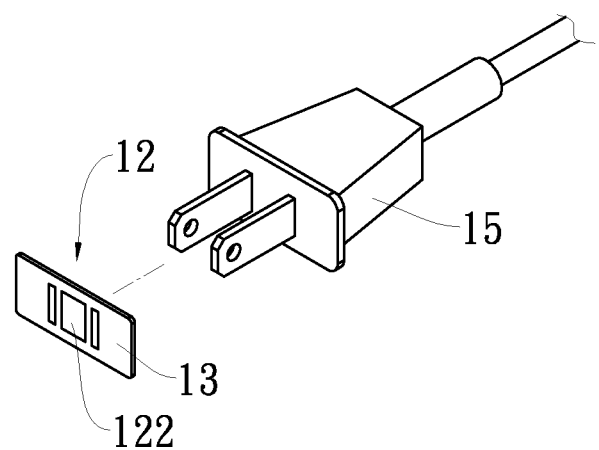
FIG. 3 is an exploded perspective view of a plug of an electric appliance of the identification detection system in FIG. 1 having an identification transmission circuit formed within a film detachably disposed on the plug.
Figure 4:
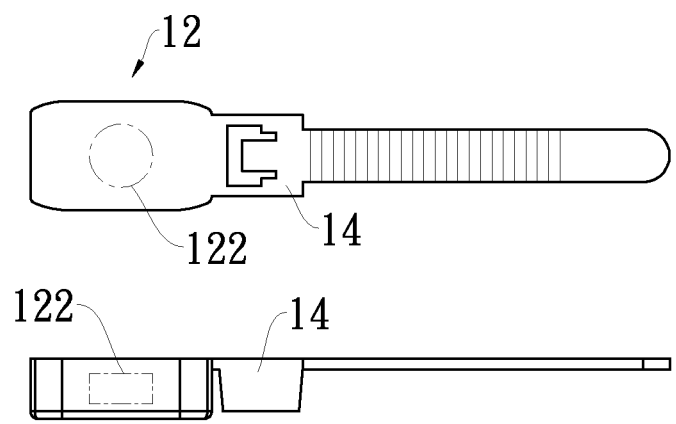
FIG. 4 is a plane view of a binding strip of the identification detection system in FIG. 1 having an identification transmission circuit formed in the binding strip.
Figure 5:
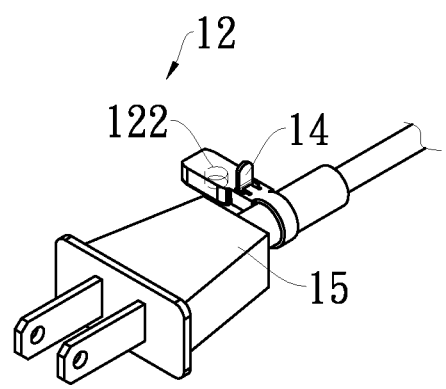
FIG. 5 is a perspective view of the binding strip in FIG. 4 securely mounted around a plug.

Each of the electric appliances 1, such as a television, computer, air conditioner, fan, desk lamp and the like, has a dedicated identification transmission circuit 12 or a ESID (Energy signature ID) tag connected to a power-connecting loop 11. The identification transmission circuit 12 may be an RFID tag chip 121 directly mounted on a power plug 15 of a new generation of electric appliance 1 as shown in FIG. 2, a standalone film 13 having an RFID tag chip 122 and detachably mounted on the power plug 15 as shown in FIG. 3, or a binding strip 14 having an RFID tag chip 122 as shown in FIGS. 4 and 5 to be mounted around a power plug 15 of a conventional electric appliance 1 so that the conventional electric appliance 1 can own a dedicated ESID.

The power sockets 2 are mounted within a power supply region. Each power socket 2 has at least one identification receiver 21 for receiving identification transmission signals transmitted from the corresponding plugged electric appliance 1 and obtaining the corresponding ESID. When implemented, each power socket 2 has an identification receiver 21 and two sets of plug holes 22. Preferably, the identification receiver 21 is connected to the two sets of plug holes 22.

The energy management units 3 are respectively mounted in the power sockets 2 to connect with the corresponding identification receivers 21, recognize the respective dedicated electric appliances 1 by determining the ESID, and record power consumption information of the corresponding electric appliances. The power consumption information contains a plug-in position, a power consumption value, an operating time, an operating frequency and so forth. When the ESID is disconnected with the power region, the system will acknowledge that the device is plugged off the power socket.

The energy management server 4 is connected to the energy management units 3 and the identification receivers 21 respectively mounted on the power sockets 2 so as to communicate with the energy management units 3 and the identification receivers 21 in a wired or wireless manner, and can rename the electric appliances 1, such as television TV1, TV2 or computer PC 1, PC 2 and so forth, for easily distinguishing the electric appliances 1.

With reference to FIGS. 1 to 5, any of a home, office or factory can be treated as in a same power supply region. Whether new or old, each electric appliance 1 can have a unique ESID by using an identification transmission circuit 12 securely attached or detachably mounted on a corresponding power plug 15. When each electric appliance 1 is operated, the dedicated identification receiver 21 mounted on a corresponding power socket 2 reads a unique ESID of the electric appliance 1. The built-in energy management unit 3 serves to measure and calculate the power consumption information from the plugged electric appliance 1 and forwards the power consumption information of the electric appliance 1 together with the unique ESID to the energy management server 4 for storage and recording. Hence, the actual power consumption of each electric appliance 1 in a same power supply region can be effectively tracked, and the individual and overall power consumption of all the electric appliances 1 within the power supply region can be collected, recorded and calculated as the reference for future power management.

Figure 6:
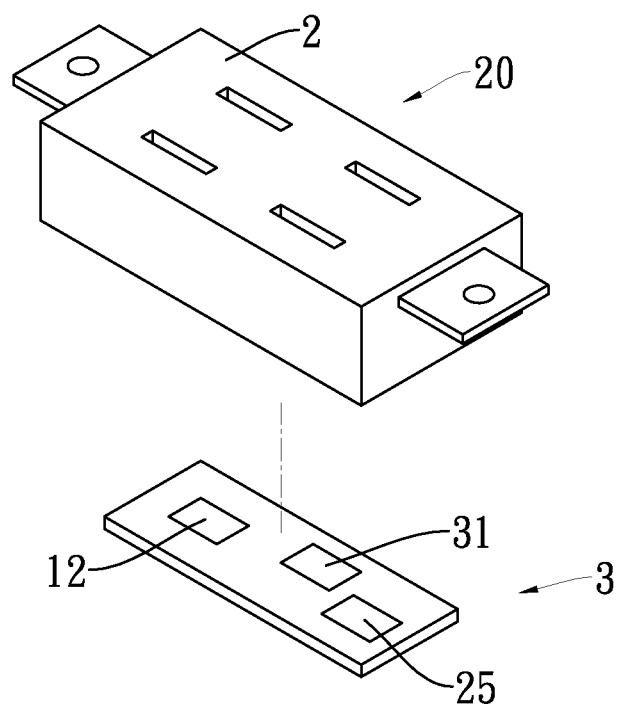
FIG. 6 is a perspective view of a power socket of the identification detection system in FIG. 1 having an identification receiver and a power management unit.
Figure 7:
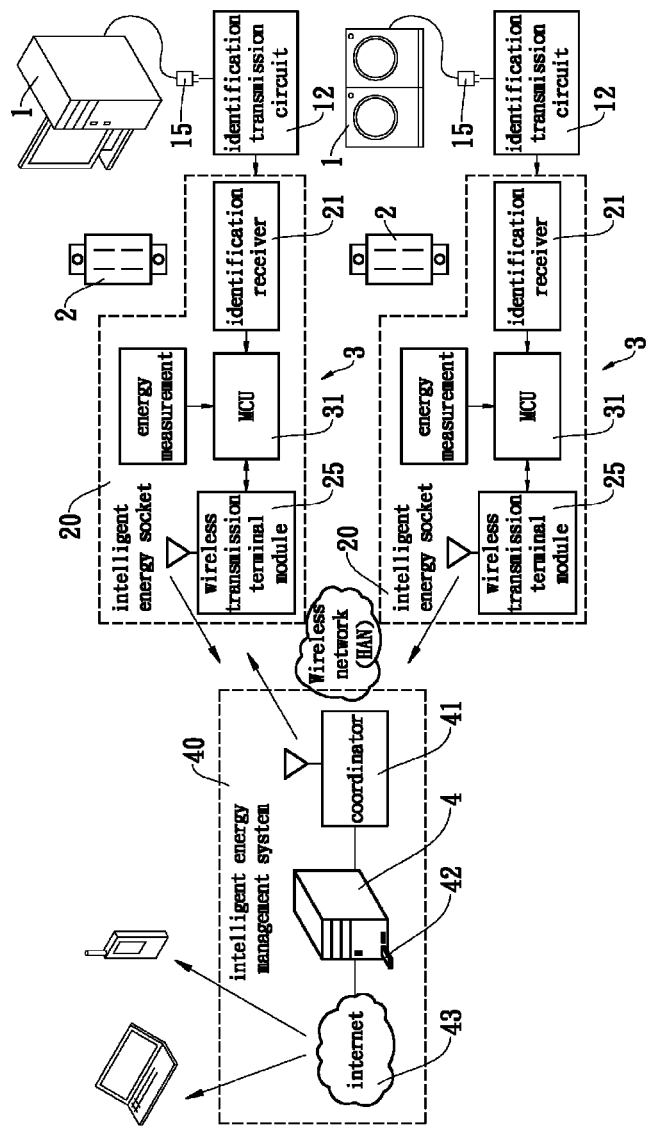
FIG. 7 is an operational functional block diagram of the identification detection system in FIG. 1 using a wireless transmission scheme.

With reference to FIGS. 6 and 7, based on the foregoing operating concept, a most feasible wireless application in accordance with the present invention is shown. The power socket 2 has an identification receiver 21 mounted therein in collaboration with a MCU 31 as an energy management unit 3 and a Zigbee-based wireless transmission terminal module 25 to constitute an intelligent energy socket 20.

The energy management server 4 has a Zigbee coordinator 41, a Wi-Fi wireless network adapter 4 and an ADSL internet 43 to constitute an intelligent energy management system 40.

When the intelligent energy management system 40 is operating, a power plug 15 of an electric appliance 1 having a corresponding identification transmission circuit 12 or ESID is plugged in the aforementioned intelligent energy socket 20 for the intelligent energy socket 20 to read the dedicated ESID of the electric appliance 1 and store the ESID in the MCU 31 of the energy management unit 3. Meanwhile, the Zigbee-based wireless transmission terminal module 25 sends a message to the intelligent energy management system 40 so that the dedicated ESID of the electric appliance 1 is automatically added to a HAN (Home Area Network) queue and is managed by the intelligent energy management system 40. The intelligent energy management system 40 is programmed to automatically poll the power consumption information of the intelligent energy socket 20 based on a schedule, for example, every 3, 5 or 10 minutes, and automatically records the polled power consumption information corresponding to the dedicated ESID of a corresponding electric appliance 1 in a database. When the electric appliance 1 is unplugged from the power socket 15, the dedicated ESID is automatically deleted from the HAN queue. For example, when the electric appliance 1 is unplugged from a power socket in the living room and is plugged in a power socket in other room, the ESID of the electric appliance 1 is automatically deleted from the HAN queue and another intelligent energy socket 20 in other room further reads the ESID of the electric appliance 1 and store the ESID to the HAN queue again.

Therefore, the intelligent energy sockets 20 serve to transmit energy consumption information of the electric appliances 1 having dedicated identification transmission circuits 12. The power consumption information of all home appliances can be stored and recorded in the intelligent energy management system 40 by the use of the ESID tag. The acquired power consumption information is accurate and useful and can be transmitted to a power company through a network. Besides significant enhancement of timeliness and accuracy of remote meter reading, the trouble arising from human error in reading meter and untimely power consumption information can be avoided.

With the present invention power company can monitor power usage condition everywhere with a remote monitoring and control system. In the event that power shortage occurs at one place, excess electricity can be allotted from elsewhere. One can always get hold of the power consumption and adjust power consumption behavior so as to achieve the power-saving and money-saving concern in using power and implement nationwide optimized power allotment as well as monitoring and control. Effective load management measure can be taken to balance among power generation, power supply and power consumption and greatly strengthen reliability of power grid.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. An identification system for power consumption of electric appliances comprising:
    multiple electric appliances, each electric appliance having:
        a dedicated identification transmission circuit connected to a power-connecting loop; and
        a power plug;
    wherein multiple power sockets are mounted within a power supply region, each power socket having at least one identification receiver for receiving identification transmission signals transmitted from a corresponding plugged electric appliance and obtaining a corresponding identification code;
    multiple energy management units are respectively mounted in the power sockets to connect with the corresponding identification receivers, recognize the respective electric appliances by determining the identification code, and record power consumption information of the corresponding electric appliances; and
    an energy management server is connected to the energy management units respectively mounted on the power sockets so as to communicate with the energy management units and the identification receivers in a wired or wireless manner;
    whereby individual and overall power consumption of all the electric appliances within the power supply region can be collected, recorded and calculated as a reference for future power management.

2. The identification system for power consumption of electric appliances as claimed in claim 1, wherein the energy management server stores information.

3. The identification system for power consumption of electric appliances as claimed in claim 2, wherein the identification transmission circuit is an RFID tag chip directly mounted on the power plug of a corresponding electric appliance.

4. The identification system for power consumption of electric appliances as claimed in claim 2, wherein the identification transmission circuit is a standalone film having an RFID tag chip detachably mounted on the power plug of a corresponding electric appliance.

5. The identification system for power consumption of electric appliances as claimed in claim 2, wherein the identification transmission circuit is a binding strip having an RFID tag chip and mounted around the power plug of a corresponding electric appliance.

6. The identification system for power consumption of electric appliances as claimed in claim 2, wherein each power socket has:
    at least two sets of plug holes; and
    an identification receiver connected to the at least two sets of plug holes.

7. The identification system for power consumption of electric appliances as claimed in claim 6, wherein the power socket has one of the identification receivers mounted therein in collaboration with a processor as a corresponding energy management unit and a Zigbee-based wireless transmission terminal module to constitute an intelligent energy socket; and
    the energy management server has a Zigbee coordinator, a Wi-Fi wireless network adapter and an ADSL internet to constitute an intelligent energy management system.

8. The identification system for power consumption of electric appliances as claimed in claim 6, wherein the power consumption information contains a plug-in position, a power consumption value, an operating time and an operating frequency.

9. The identification system for power consumption of electric appliances as claimed in claim 1, wherein the energy management server renames the electric appliances based on the identification codes.

10. The identification system for power consumption of electric appliances as claimed in claim 9, wherein the identification transmission circuit is an RFID tag chip directly mounted on the power plug of a corresponding electric appliance.

11. The identification system for power consumption of electric appliances as claimed in claim 9, wherein the identification transmission circuit is a standalone film having an RFID tag chip detachably mounted on the power plug of a corresponding electric appliance.

12. The identification system for power consumption of electric appliances as claimed in claim 9, wherein the identification transmission circuit is a binding strip having an RFID tag chip and mounted around the power plug of a corresponding electric appliance.

13. The identification system for power consumption of electric appliances as claimed in claim 9, wherein each power socket has:
    at least two sets of plug holes; and
    an identification receiver connected to the two sets of plug holes.

14. The identification system for power consumption of electric appliances as claimed in claim 13, wherein the power socket has at least one of the identification receivers mounted therein in collaboration with a processor as a corresponding energy management unit and a Zigbee-based wireless transmission terminal module to constitute an intelligent energy socket; and
    the energy management server has a Zigbee coordinator, a Wi-Fi wireless network adapter and an ADSL internet to constitute an intelligent energy management system.

15. The identification system for power consumption of electric appliances as claimed in claim 13, wherein the power consumption information contains a plug-in position, a power consumption value, an operating time and an operating frequency.

* * * * *